United States Patent [19]

Cooper et al.

[11] 4,088,572

[45] May 9, 1978

[54] ULTRAFILTRATION PURIFICATION OF SOLUTION OF POLYMERIC ANTHRAQUINONE COLORANTS

[75] Inventors: Anthony R. Cooper, Los Altos; Robin G. Booth, Palo Alto; David P. Matzinger, Redwood City, all of Calif.

[73] Assignee: Dynapol, Palo Alto, Calif.

[21] Appl. No.: 743,206

[22] Filed: Nov. 18, 1976

[51] Int. Cl.$^2$ ............................................. B01D 13/00
[52] U.S. Cl. .................................. 210/23 F; 260/369
[58] Field of Search ....................... 260/369; 210/23 F

[56] References Cited

U.S. PATENT DOCUMENTS 1,890,040  12/1932  Luttringhaus et al. .............. 260/369

2,660,580  11/1953  Von ................................. 260/369 X

OTHER PUBLICATIONS

Porter et al., "Membrane Ultrafiltration", from Chem. Tech., Jan., 1971, pp. 56–63.

Primary Examiner—Frank A. Spear, Jr.
Attorney, Agent, or Firm—William H. Benz

[57] ABSTRACT

The ultrafiltration purification of aqueous solutions of polymeric anthraquinone colorants, wherein low molecular weight impurities are removed in an ultrafiltrate leaving a purified anthraquinone colorant-bearing retentate, is carried out with improved efficiency when pyridine is present and maintained in the aqueous solutions at a level of from 1 to 20% by volume.

7 Claims, No Drawings

ULTRAFILTRATION PURIFICATION OF SOLUTION OF POLYMERIC ANTHRAQUINONE COLORANTS

BACKGROUND OF THE INVENTION

This invention relates to an improvement in an ultrafiltration process for purifying solutions of polymeric anthraquinone colorants.

U.S. Pat. No. 3,920,855 of Dawson et al., issued Nov. 18, 1975, and copending patent application Ser. No. 520,530, filed Nov. 4, 1974, by Gless et al. now U.S. Pat. No. 4,018,826, issued on Apr. 19, 1977 and Ser. No. 638,730, filed Dec. 8, 1975, by Wingard et al. and Japanese patent applications of Tanabe Segaku, such as Nos. 41-14433, 41-14434 and 44-13382, disclose that colors, including anthraquinone colors, can offer advantages in polymeric form. U.S. patent application Ser. No. 727,097 filed on Sept. 27, 1976 by Ned Weinshenker further discloses that ultrafiltration is useful to purify polymeric colorants and free these colorants from undesired monomeric and low molecular weight polymeric impurities. Ultrafiltration is disclosed by that application to be applicable to polymeric colorants, generally. The present invention concerns an improvement which increases the efficiency of ultrafiltration when it is applied to purify polymeric anthraquinone colorants.

STATEMENT OF THE INVENTION

It has now been found that aqueous solutions of water-soluble anthraquinone group containing polymeric colorants are freed of impurities of up to 1000 Dalton molecular weight by ultrafiltration with improved efficiency when minor amounts of pyridine are present in the aqueous solutions.

Following the teachings of this invention, when a crude polymeric dye preparation reaction mixture containing an aqueous solvent, polymeric anthraquinone colorant of molecular weight above about 1000 Daltons and, as contaminants, salts, organic monomers and polymers of molecular weight below about 1000 is purified by an ultrafiltration process wherein the reaction mixture is contacted under ultrafiltration conditions with a semipermeable membrane to fractionate the mixture and form an aqueous retentate containing the polymeric colorant of molecular weight above 1000 and an aqueous permeate (also called an ultrafiltrate) containing salts, monomers and polymers of molecular weight below about 1000, the desired fractionation occurs with improved efficiency when the reaction mixture contains from about 1% to about 20% by volume (basis reaction mixture) of pyridine, and this level of pyridine is maintained during at least part of the ultrafiltration.

DETAILED DESCRIPTION OF THE INVENTION

This Detailed Description is in four parts. First, the polymeric colorants recovered with improved efficiency by the employment of the present invention and the crude reaction mixtures from which they are recovered are generally described. Second, the ultrafiltration process is set forth. Third, the pyridine addition conditions are described. Fourth, examples are given.

The Colorants and Their Reaction Mixtures

The colorants purified by this invention are polymeric anthraquinone colorants. This term is defined to mean that they comprise a plurality of anthraquinone optical chromophores covalently bonded to a non-chromophoric polymeric backbone. These colors are water soluble, that is, they are soluble in neutral room temperature water to an extent of not less than 500 parts per million weight. An anthraquinone optical chromophore is defined to be an anthraquinone group which produces a color which may be detected by the human eye.

The reaction mixtures which are purified by the present improved process result from either one of two general preparative methods. In the first method an anthraquinone monomer containing a polymerizable group such as a vinyl group is covalently polymerized or copolymerized to yield a polymer. In the second method, a preformed polymer backbone having active sites is reacted with an anthraquinone chromophore under conditions such that the chromophore is covalently bonded to the polymer.

The first reaction can be depicted as

wherein $n$ is a number greater than 1, X is a polymerizable organic group and An is an anthraquinone chromophore. X may include, in this case, any organic group which may be polymerized into a covalently bonded backbone such as, for example, an olefinic double bond, especially in a vinyl configuration, a styryl group, an unsaturated acid, an unsaturated ester, a halohydrin group, an acid halide group, an epoxy group, a ketene, an acid azide, a urethane or the like.

The second reaction can be depicted as

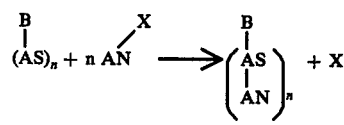

wherein B is a backbone carrying $n$ (a number greater than 1) active sites, AS; and X is, in this case, a leaving group or other point of attachment on the anthraquinone chromophore, An. X in this case may include, for example, leaving groups such as —Cl, —Br, —I, —SO$_3$Na, N$_2^+$ Cl, or —NO$_2$ groups, or the like. Other monomers may be copolymerized with the

compounds, if desired. The

materials used in this case employ as AS's, for example, amines, acids, halides, halohydrins, cyanos, and the like. The B's, in this case, should be covalently bonded materials which are stable under the conditions of use. B can be hydrocarbon, or it can contain ether or other linkages stable under conditions of synthesis or use. B is preferably hydrocarbon.

In a preferred configuration, the AS groups are amine groups, as found in polymeric and copolymeric amines.

Homopolymeric amines include poly (vinylamine) poly (N-methyl-vinylamine) poly (α-methyvinylamine) poly (α-butylamine) and the like while copolymeric amines can include any of these groups, plus other comonomers added to vary or improve product properties. Such added materials include vinyl sulfonates, acrylic acid, methacrylic acid esters, epichlorohydrin, or the like.

A number of preferred backbones include poly(vinylamine), poly(vinylamine co vinylsulfonate), and poly (vinylamine co acrylic acid).

The colorants may contain additional nonchromophore groups such as sulfonate or carboxyl or alcohol groups attached via AS's as needed to vary the physical properties of the final colorants.

The chromophores present in the polymeric colorants, An in the structural formulae, are anthraquinones. The term "anthraquinone" is used in its classic sense to encompass those chromophoric materials having a

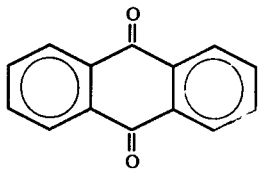

base.

Typical anthraquinone chromophores include

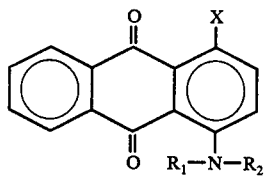   I.

Aminoanthraquinones of the structure of Formula I, wherein $R_1$ is a hydrogen or a lower saturated alkyl of up to four carbon atoms or an aryl or alkaryl of from six to eight carbons and X is a leaving group or a polymerizable group. These are useful to give the range of blue colorants listed in Table I.

TABLE I

| | Compound | Color |
|---|---|---|
| $R_1$ | $R_2$ | |
| hydrogen | hydrogen | purplish blue |
| hydrogen | methyl | greenish blue |
| hydrogen | ethyl, propyl or butyl | greenish blue |
| hydrogen | aryl | navy blue |

Anthrapyridones of the structure of Formula II

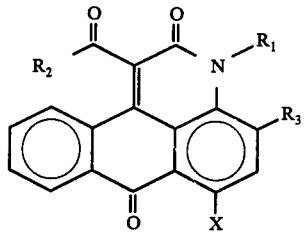   II.

wherein X is a leaving group, $R_1$ is hydrogen, a lower saturated alkyl of from 1 to 4 carbon atoms inclusive, or an aryl grouping of about 6 carbons, $R_2$ is a 1 to 4 carbon lower saturated alkyl, a 1 to 4 carbon lower saturated alkoxy, or an aryl grouping of about 6 carbon atoms, and $R_3$ is hydrogen or a 1 to 4 carbon lower saturated alkyl. These chromophores are rich reds. Preferred among the anthrapyridones are these according to Formula II wherein $R_1$, $R_2$, and $R_3$ are as shown in Table II.

TABLE II

| $R_1$ | $R_2$ | $R_3$ |
|---|---|---|
| hydrogen | 1 – 4 carbon alkyl | 1 – 4 carbon alkyl |
| hydrogen | methyl | methyl |
| hydrogen | methoxy | 1 – 4 carbon alkyl |
| hydrogen | methoxy | methyl |
| hydrogen | ethoxy | 1 – 4 carbon alkyl |
| hydrogen | ethoxy | methyl |
| hydrogen | phenyl | methyl |
| methyl | methyl | hydrogen |
| methyl | phenyl | hydrogen |
| ethyl | methyl | hydrogen |
| methyl | methoxy | hydrogen |
| ethyl | methoxy | hydrogen |

Anthrapyridines of the structure of Formula III:

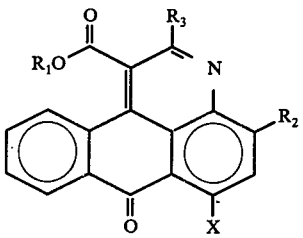   III.

wherein X is a leaving group, $R_1$ is a 1 to 4 carbon lower alkyl group or aryl grouping of about 6 carbons, $R_2$ is hydrogen or a 1 to 4 carbon lower alkyl, and $R_3$ is a 1 to 4 carbon alkyl group or aryl grouping of about 6 carbons. These colorants range in hue from yellows to reds to brown. Preferably $R_2$ is hydrogen or methyl.

Pyridinoanthrone dyes of the structure of Formula IV;

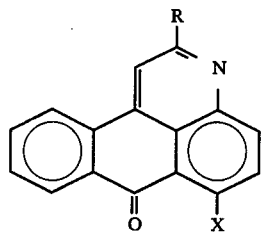   IV.

may also be used, wherein R is hydrogen or a 1 to 4 carbon saturated alkyl.

Anthrapyrimidines of the structure of Formula V;

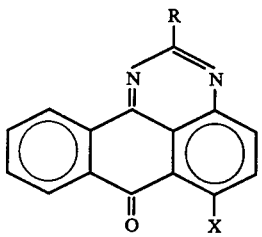   V.

wherein R is hydrogen, a 6 carbon aryl, a 1 to 4 carbon saturated alkyl or a halogen as described in U.S. Pat. No. 1,947,855 which deals with monomeric colorants. These materials are reds and yellows.

Anthrapyrimidones of the structure of Formula VI.

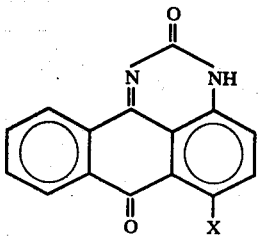

VI.

These materials are violets. Substitution of 4 position by amino group gives violet dye (U.S. Pat. No. 1,004,107). A hydrogen in the 4 position gives a greenish yellow.

Anthraquinones of the structure of Formula VII.

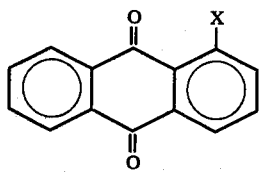

VII.

These materials are reds.

Anthrapyridones of the structure of Formula VIII;

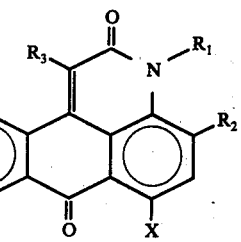

VIII.

wherein $R_1$ is hydrogen or methyl, $R_2$ is hydrogen or 1 to 4 carbon lower alkyl and $R_3$ is hydrogen, a halogen (i.e., Br or Cl), cyano (i.e., —CN), $NO_2$ or a lower alkyl of 1 to 4 carbon atoms.

Another group of useful anthraquinones are those having monomeric forms with a sulfonyl chloride since they may be easily attached to an amine backbone via the well known Schotten-Baumann reaction. Exemplary chromophores of this class and their chloro precursors include the materials shown in Table III. Also listed in Table III are several nonazo chromophores which are attached via the Schotten-Baumann reaction.

TABLE III

| Chromophore | Precursor |
|---|---|
| (Red) structure with $R_1$, $R_2$, $R_3$, $R_4$, $SO_2^-$ | structure with $R_1$, $R_2$, $R_3$, $R_4$, $SO_2Cl$ |
| $R_1$ = H, or 1 to 4 C alkyl $R_2$ = H, or 1 to 4 C alkyl $R_3$ = 1 to 4 C alkyl or alkoxy $R_4$ = 1 to 4 C alkyl or alkoxy | |
| (Red) anthraquinone-NH-phenyl-$SO_2^-$ | anthraquinone-NH-phenyl-$SO_2Cl$ |
| (Yellow) benzanthrone-O-phenyl-$SO_2^-$ | benzanthrone-O-phenyl-$SO_2Cl$ |

TABLE III-continued

| Chromophore | Precursor |
|---|---|
| 1-amino-4-(p-tolylamino)anthraquinone-2-sulfonate (Blue) | 1-acetamido-4-(p-tolylamino)anthraquinone-2-sulfonyl chloride |
| Benzanthrone-sulfonate (Yellow), $R_1 = CH_3O-$, $CH_3S-$, or Br | Benzanthrone-sulfonyl chloride |
| 1,4-diamino-anthraquinone derivative (purple), $R_1 = H$, $CO_2 - 1$ to 4 carbon alkyl or $CO - 1$ to 4 carbon alkyl; $R_2 = H$ or 1–4 carbon alkyl; $R_3 = -CH_3$ or $-C_6H_4-CH_3$ | Corresponding sulfonyl chloride |
| Red as shown in Brit. Patent 525,091 (1941); $R_1$ and $R_2 = -CH_3$ or $-C_6H_4-CH_3$ | Corresponding sulfonyl chloride |

The reaction mixtures from which these colorants are recovered are water-based solutions. In the reaction sequence wherein monomeric $$\overset{X}{\underset{AN}{|}}$$

is polymerized, the reaction mixture may have the following composition:

| | %, basis total mixture | %, basis polymeric colorant of molecular weight above 1000 Daltons |
|---|---|---|
| Polymeric colorant $\overset{(X)_n}{\underset{AN}{|}}$ of molecular weight above 1000 Daltons (X) | 0.1 – 10 (preferably 0.2 – 9) (most preferably 0.5 – 8) | — |
| Unreacted monomer, $\overset{X}{\underset{AN}{|}}$ organic polymer below 1000 molecular weight, $\overset{X}{\underset{AN}{|}}$ degradation products, and organic comonomers. | 0.04 – 10% | 0.5 – 100% (preferably 10 – 75% w) (most preferably 1.5 – 65% w) |
| Polymerization Catalyst | 0 – 0.1 | 0 – 2% |
| Inorganic salts & base | 0 – 20 | 10 – 400% (preferably 20 – 200%) (more preferably 30 – 150%) |
| Solvent (water, with up to about ¼ water-miscible organics such as lower alkanols, alkanones, and ethers.* | 75 – 98 | — |

In the reaction sequences wherein $$\overset{X}{\underset{AN}{|}}$$

is reacted with a preformed polymer backbone, the reaction mixture may have the following composition:

|  | %, basis total mixture | %, basis polymeric colorant of molecular weight above 1000 Daltons |
|---|---|---|
| Polymeric colorant of molecular weight above 1000 Daltons. | 0.1 – 10 (preferably 0.2 – 9) (more preferably 0.5 – 8) | — |
| Monomeric chromophores, polymers below 1000 Daltons, organic degradation products, organic solubilizing groups. | 0.04 – 10.0 | 5 – 100% (preferably 10 – 75) (more preferably 15 – 65) |
| Inorganic salts and base. | 0.5 – 20 | 10 – 400% (preferably 20 – 200%) (more preferably 30 – 150) |
| Solvent (water with up to about ¼ water-miscible organics such as lower alkanols, alkanones, and ethers.* | 75 – 98 | |

*For example, isopropanol, ethanol, acetone, methyl ethyl ketone, ethylene glycol, and the like.

These descriptions are quite general. It will be appreciated that a particular polymeric colorant synthesis may have a particular composition which, while similar to these guidelines, will fall somewhat outside these ranges.

The Ultrafiltration Process

The crude reaction mixture of the type described is purified using an ultrafiltration process. Ultrafiltration is a well known membrane separation process. A solution is allowed to contact a permeable membrane which acts as the separating medium, under pressure which acts as the driving force. Large molecules are isolated in the solution retained by the membrane — "the retentate." Small molecules pass through the membrane along with a portion of the solvent to form a solution called "the ultrafiltrate." The membranes employed are asymmetric semipermeable microporous membranes with pore diameters in the range of from about 1 millimicron to about 500 millimicrons. Excellent results are obtained when anisotropic membranes are employed such as those developed by Amicon Corporation, marketed under the names PM-10, PM-30 and described in U.S. Ser. No. 755,320, filed Aug. 26, 1968, by Alan S. Michaels. Other suitable membranes are marketed by a variety of manufacturers and include ABCOR's FEG membranes types D or M and and HF 100, 200 and 300; T. J. Engineering's Osmonics Inc. SEPA membranes and Carbide's UCARSEP membranes. The conditions employed in the ultrafiltration include an inlet pressure of from 15 to 200 psig, preferably an inlet pressure of from 30 to 125 psig and an outlet pressure 10–25 pounds below the inlet pressure. The ultrafiltration may be carried out at a moderate temperature such as from low room temperature (10° C) to about 75° C with temperatures of from about 20° to about 50° C being preferred.

The ultrafiltration may be carried out in a batch or continuous mode. In either mode, it may be carried out with or without liquid addition. During ultrafiltration, solvent (water plus miscible organics in this case) passes through the ultrafiltration membrane. This property can be used effectively to concentrate a colorant solution, if desired. However, when impurities are being removed, it is often advantageous to add impurity-free makeup solvent to the retentate and maintain constant the retentate volume. This constant volume process is often referred to as diafiltration. When one original volume of solvent has passed through the membrane and been added, this is referred to as a diavolume.

It is also often of advantage to control the pH of the system during ultrafiltration. As is pointed out in concurrently filed patent application U.S. Ser. No. 743,207 of Copper, et al., the removal of impurities from polymeric colorants proceeds with greater efficiency when the pH of the retentate is elevated such as to pH 9 to pH 13 and preferably to pH 10 to pH 13 or greater by addition of base, such as KOH, NaOH or $NH_4OH$. During the first several cycles through the ultrafiltration unit in a diafiltration mode it may be of advantage to use a makeup solution which has a pH similar to the retentate. When substantial (>1%) salt is present, these basic pH's also assure that the polymeric colorant stays in solution.

Optional Other Steps

Several other steps are commonly present in an ultrafiltration process. For one, it is common to microfilter all solids such as dirt, solid catalyst, etc., from the solution prior to ultrafiltration to avoid fouling the ultrafiltration membrane. This step, while often useful or needed for optimum operation, is not a part of this invention. Another optional step, outside this invention, is the separate removal of dissolved catalyst species such as by ion exchange. This step can occur prior or following ultrafiltration and is shown removing soluble copper catalyst in the examples. It could work similarly with other catalysts.

The Pyridine Addition

As noted in the Statement of the Invention, the present invention involves improving the ultrafiltration purification of a water-soluble anthraquinone polymeric colorant by adding pyridine to the ultrafiltration system. Adding a limited amount of pyridine to the reaction mixture increases the efficiency with which ultrafiltration will separate the impurities from the polymeric colorants.

Preferably, the concentration of added pyridine is initially from about 1 to about 20%, more preferably from about 3 to about 15% by volume, based on the initial crude reaction product fed to the ultrafiltration unit. This concentration is advantageously essentially maintained during from 1 to about 10, and preferably from about 2 to about 6 diavolumes of diafiltration by adding pyridine to the added makeup liquid. Following this pyridine-added diafiltration, additional ultrafiltration, such as 1 to 10, and preferably 2 to 8 diavolumes, using pyridine-free (and, if present, base-free) makeup liquid can be used to remove residual pyridine (and, if present, base).

The present invention will be demonstrated by the following examples wherein ultrafiltration of polymeric water-soluble anthraquinone colorants with and without pyridine addition are demonstrated. These examples will show high increased efficiencies — the advantages of the present invention. These examples are for illustration and are not to be construed as limiting, as the present invention is defined and set out by the appended claims.

EXAMPLE I

This example sets forth the addition of pyridine during ultrafiltration purification of a polymeric colorant. It further discloses the final recovery of the purified colorant by spray-drying.

A. Preparation of Backbone

To 2304 g of acetamide (technical) in a 12 liter reaction flask is added 62.2 ml of 6M aqueous sulfuric acid followed immediately by 661 g of acetaldehyde (99+%). This mixture is stirred and heated until the internal temperature reaches 78° C (11 minutes) at which point the clear solution spontaneously crystallizes, causing a temperature rise to 95° C. The reaction product, ethylidene-bis-acetamide, is not separated. Heating and stirring are continued for another 5 minutes to a temperature of 107° C and a mixture of 150 g calcium carbonate (precipitated chalk) and 150 g of Celite ® diatomaceous earth powder is added. A first distillate fraction of water and acetamide is removed. The remaining materials are cracked at 35 mm Hg and 185° C. A fraction made up of vinylacetamide and acetamide is taken overhead, analyzed by NMR and found to contain 720 g of vinylacetamide and 306 g of acetamide. A portion of this pooled material is dissolved in isopropanol, cooled, and filtered to yield a stock solution. This stock solution is analyzed and found to be 4.1 Molar in vinylacetamide.

Into a five liter flask is added 505 ml (272 g) of a vinylacetamide solution obtained by stripping isopropanol from 900 ml of the above stock solution (containing 3.69 moles of vinyl acetamide). AIBN (15 g) in 1500 ml of water is added followed by 1279 g of 25% w sodium vinyl sulfonate in water (Research Organic Corp.) and a liter of water. This is three equivalents of sulfonate per two equivalents of vinylacetamide. Following deoxygenation, the mixture is heated to 65° C and there maintained with stirring for three hours. This reaction mixture is then reduced to    volume, solid IBN is removed and the liquid added to 8 gallons of isopropanol. The copolymer precipitate is collected and dried in vacuum to yield 865 g of solid copolymer (MW 16 × 10⁴). Whenever an experimental molecular weight is given in this specification, it is derived by gel permeation techniques. In the primary technique, a silanized porous glass support is used with a 0.01 M LiBr in DMF eluent. Detection is by refractometer with standardization being based on suitable purchased poly(styrene) or poly(styrenesulfonate) standards.

Into a two liter flask is added 863 g of the just-noted solid product, 2.5 liters of water and a liter of concentrated hydrochloric acid. The mixture is refluxed (99°–110° C) for about 24 hours, and cooled; the solid precipitate is washed, and dissolved in 3 liters of 10% NaOH. This reaction mixture is added to about 12 liters of methanol to give 400 g of fine solid precipitate.

B. Preparation of Chromophore

Into a 5 liter kettle is charged 750 of 1-amino-2-methyl-4-bromo-anthraquinone (Sandox AMBAX), 1550 g of ethylacetoacetate, 580 g of nitrobenzene, and 196 g of sodium acetate. The mixture is deoxygenated and heated to 150° + over about 4 hours. During the last 2½ hours, 385 ml of distillate is collected. The product is cooled, collected on a filter and washed with acetone and water and dried to yield 830 g of the chromophore

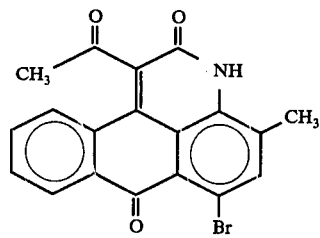

C. Attachment of Chromophore

Three hundred grams of the copolymer of Part A is dissolved in 4.2 liters of 1 normal NaOH and the mixture is heated to 90° C. Then 480 g of the chromophore of Part B and 20 g of CuCl₂ catalyst are added. The mixture is heated at 90°–101° C for 3½ hours, while an additional four liters of NaOH and an additional 20 g of catalyst are added. The mixture is cooled by adding 10.7 kg of ice. HCl, NaOH and acetic anhydride are added to buffer the solution at pH 10.

D. Ultrafiltration

Five gallons of the solution of Part C is prefiltered three times with a 0.25 micron filter to remove solids. This material contains an estimated 412 g of polymeric colorant of the formula

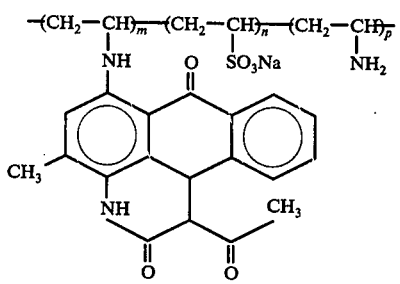

having a molecular weight above 1000 Daltons.

It also contains organic impurities, especially unreacted chromophore, and the chromophore degradation products, in a total amount of greater than 10% by weight (basis polymeric colorant). Further, it contains inorganic salts in an amount at least equal to the amount of polymeric colorant. To this material is added 660 ml of 19.1 N NaOH and 2.2 liters of pyridine (∼ 10% pyridine by volume).

This pyridine-containing solution is charged to the feed tank of an ultrafiltration unit. This unit employs two hollow fiber filtration cells containing a total of 47 square feet of Romicon PM-10 ultrafiltration membrane, an anisotropic asymmetric membrane having a nominal molecular weight cut-off of 10,000 Daltons. This is a thin channel membrane with an I.D. of 0.40 mm. Inlet pressure is 85 psig. Temperature is 35°–40° C. First. the solution is concentrated to four gallons. The unit is then run in a diafiltration mode. That is, as ultrafiltrate is removed, an equivalent amount of make-up solvent is added to the retentate. The make-up solvent is a pH 12.5 10% pyridine solution. Thus, the pyridine level is maintained during ultrafiltration. Ten diavolumes of ultrafiltration effectively removes the organic impurities to a level of less than 0.1% w (basis colorant). Then, seven diavolumes of ultrafiltration are carried out using a water make-up. This removes pyridine and base. The system is brought to pH 7 by hydrochloric acid addition. Five additional diavolumes of ultrafiltration (with water make-up) removes neutralization products. This purified solution has the following composition.

| | |
|---|---|
| Polymeric colorant with molecular weight above 1000 Daltons | 99.7% (basis solids) |
| Insolubles | 0.02% |
| Salt | 0.073% |
| Organic impurities below 1000 Daltons | 0.24% |

E. Spray-Drying

The purified solution of Part D is spray-dried. The resulting solid product is useful as a colorant for fibers, papers, and especially for edibles such as foods, beverages and the like.

EXAMPLE II

This example illustrates the pyridine addition of this invention in the purification of a second polymeric anthraquinone colorant.

A. Preparation of Backbone

To 462g of acetamide (technical) is added 12.45 ml of 6M aqueous sulfuric acid followed immediately by 168 ml (3 moles) of acetaldehyde (99+ %). This mixture is stirred and heated until the internal temperature reaches 70° C (9 minutes). After another minute of heating, the 95° C clear solution spontaneously crystallizes, causing a temperature rise to 106° C. The reaction product, ethylidene-bis-acetamide, is not separated. Heating and stirring are continued for another 5 minutes and a mixture of 60g calcium carbonate (precipitated chalk) and 30g soft glass powder is added. The resulting mixture is heated to cracking temperature and distilled at 40 mm Hg (200° C bath temperature). When the internal temperature reaches 160° C (0.5 hr.), the receiver is changed. After another 1.7 hr. the distillation is almost over, the stirrer is stopped and the heating continued. Slow distillation continues for another hour and is then stopped. The first distillation fraction is 95.9g of water and acetamide. The second fraction is 466g of orange oil and crystals. NMR indicates this mixture to contain 195g vinylacetamide (76% yield), 217g acetamide, and 54g ethylidene-bis-acetamide.

A red-brown solution of 460g of vinylacetamide, 557g acetamide, and 123g ethylidene-bis-acetamide, (one-half of five combined vinylacetamide preparations in accord with part A) in 570 ml methanol is filtered through 250g of Amerlite ® IRC-50 ion exchange resin over an 8 hour period. The column is rinsed with 1,000 ml methanol. The combined column eluant is stripped to its original volume of 1,667 ml, treated with 7.75g of AIBN polymerization catalyst (1 mole %), deoxygenated, and stirred under Argon at 65° C for 15 hours to polymerize. Solid polymer is precipitated from the resulting very thick solution by addition to 15 liters of acetone. The polymer is collected by filtration, washed with acetone and dried in a vacuum oven (80° C) for two days to afford 459g of crude poly(vinylacetamide) contaminated with acetamide as a yellow, semigranular solid having molecular weight of 200,000 as determined by Gel Permeation Chromatography, using demethylformamide as eluent and polystyrene as standards.

The crude poly(vinylacetamide) (459 g) is dissolved in 1,000 ml water with heating. Concentrated hydrochloric acid (1,000 ml) is added and the resulting dark brown solution is stirred and heated at a gentle reflux (97°–106° C) for 19 hours. A precipitate forms and is redissolved by addition of 200 ml water. Reflux is continued and over the next eight hours 1,000 ml water is added in several portions to maintain solubility of the polymer. After a total of 27 hours at reflux, the polymer is precipitated by the addition of 1,000 ml concentrated hydrocloric acid. The mixture is cooled to 18° C and the thick polymeric gum isolated by decantation and dried under vacuum at 50°–75° C with occasional pulverization for 40 hours to give 332g of poly(vinylamine hydrochloride) as a brown granular solid (77% yield from vinylacetamide, 59% from acetaldehyde). This preparation is repeated and the products are pooled.

B. Preparation of Chromophore

To a flask is added 1 kg of 2-methylanthraquinone and about 5 liters of 96% $H_2SO_4$. The mixture is stirred until it is entirely homogeneous and then cooled to 0° C. The addition of 500g of $KNO_3$ is then carried out in 10 portions in such a way that the temperature does not rise above 5° C. This requires about 2 hours. A yellow product precipitates out after roughly half the $KNO_3$ has been added.

A yellow slurry is then stirred at 0° C for 20 hours and poured into 30 gallons of ice/$H_2O$ with vigorous stirring. Stirring is stopped, the pecipitate is allowed to settle, and the liquid is removed. The precipitate is washed with water until the pH of the wash water is pH 4–5.

An aqueous slurry of the precipitate is placed in a flask. A kg of $NA_2SO_3$ is added and the mixture is heated and stirred at 95° C for 3 hours and filtered. The recovered solids (1-nitro-2-methylanthraquinone) was washed with boiling water and sucked dry.

The wet filter cake of 1-nitro-2-methylanthraquinone is combined with 4.2 kg of $Na_2S.9H_2O$ dissolved in 25 l of $H_2O$ and the slurry is heated and then stirred at 95°–99° C for 2 hours. The reaction mixture is filtered and the orangish-red solid 1-amino-2-methylanthraquinone product is washed with hot $H_2O$ until the filtrate is clear and dried in vacuo at 70° C.

200g of 1-amino-2-methylanthraquinone of Part B and 3 liters of glacial acetic acid are combined. The mixture is heated to 35° C and 170g of bromine is added in one portion. After stirring for 20 hours at 35° C an additional 34g of $Br_2$ is added and the temperature is raised to 50° C for 4 hours. The reaction mixture is cooled to room temperature and filtered. The solid product is recovered and washed with acetic acid and $H_2O$.

The wet filter cake is added to 10 l of hot $H_2O$ containing 500g of $NaHSO_3$ and stirred for 30 minutes at this temperature. The red solid 1-amino-2-methyl-4-bromoanthraquinone is recovered, washed and dried.

With magnetic stirring, 63g of the bromoanthraquinone prepared in Part C is treated with 400g of diethylmalonate and a gram of $Na_2CO_3$ for 2 hours at 180°-190° C. Volatiles are removed with an Argon stream. After cooling, the product is filtered and the residue is washed with alcohol, hot water and alcohol again and stirred overnight with 100 ml of toluene. After filtration and drying, the yield is about 70g of solid, 3'-carbethoxy-2-methyl-4-bromo-1,9-anthrapyridone, i.e.,

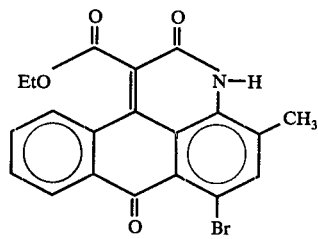

C. Preparation of a Supported Copper Material to be Used as a Coupling Catalyst A 330g portion of cupric acetate monohydrate is heated to 90° C with 27 l of water. 3 kg of 28.3% concentrated $NH_4OH$ is added following 450g of Aldrich dextrose and 300g of Baker #345 Norite ® brand activated carbon in about 3 l of water. The black mixture is refluxed while 300g of NaOH in 3 liters of water is gradually added over an hour period. The black solid which results is copper/copper oxide on carbon. It is isolated from the slurry by filtration and resuspended and filtered three times to yield about 700g of final solid product.

D. Preparation of Polymeric Colorant

A flask is charged with 32g of the poly(vinylamine hydrochloride) prepared in Example I, 170g of $Na_2CO_3$ and 1.5 l of $H_2O$. The mixture is stirred until a homogeneous solution results and 3 liters of ethylene glycol is added. Then 82g of 3'-carbethoxy-2-methyl-4-bromoanthrapyridone prepared in Part A is added to the mixture along with 40g of the copper/copper oxide on carbon catalyst prepared in Part B—the entire mixture placed in a 110° C oil bath and stirred vigorously. The coupling of the bromoanthrapyridone is over in 15–20 minutes.

The reaction mixture is filtered to remove solid residues. A clear solution of the red polymeric dye in 2:1 ethylene glycol/water is obtained:

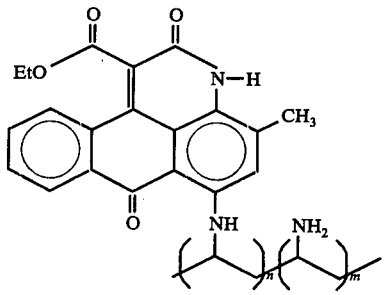

The glycol/water solution (pH 10.5) is treated with 500g of trimethylamine-sulfur trioxide complex for 48 hours at room temperature. The pH is maintained at 10–11 by the addition of 2.5 N NaOH as necessary. The reaction mixture is then heated to 50° C for 4 hours (pH maintained at 10.5). After cooling, the mixture is filtered and microfiltered through a Millipore ® filter to remove solid impurities. This results in a crude reaction product containing: polymeric colorant of the formula,

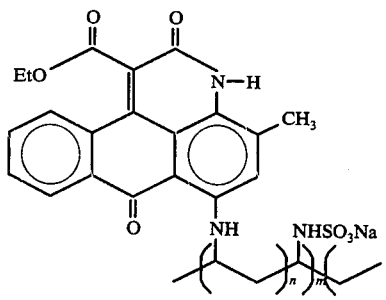

about 2% wt.
ethylene glycol ~30–33% wt
water ~58–62% wt

Polymer backbone and chromophore residues and polymeric colorant below 1,000 Dalton molecular weight—about 2% wt. Salts—about 4% wt. Trimethylamine-$SO_3$ residues—about 8% wt.

E. Ultrafiltration

The crude reaction product of Part D is ultrafiltered using the methods and materials of Example I. First, 5 diavolumes are passed using pH9 water as makeup to reduce the glycol content about one-hundredfold. Then the makeup is changed to a 5% pyridine-pH 11.5–12.0 solution. Within 10 diavolumes, impurities in the retentate are reduced to below 0.5% wt (basis solids). This retentate is passed over an ion exchange bed to remove residual copper catalyst.

The purified solution is spray-dried in accord with the teachings of Part E of Example I. This results in a purified product containing:

about 0.3% monomers and other organic materials below 1,000 molecular weight
about 0.1% salts
about 0.01% insolubles
about 6–10% water
about 90–94% (by difference) polymeric colorant.

EXAMPLE III

The beneficial effect of pyridine addition is shown by the following study which is an expansion of the run of Example II. Among the impurities present in the crude reaction mixture, monomeric chromophore and chromophore byproducts are among the most difficult to remove. These impurities are also among the most improved in removal by the present addition.

In the system of Example II, the unreacted chromophore is

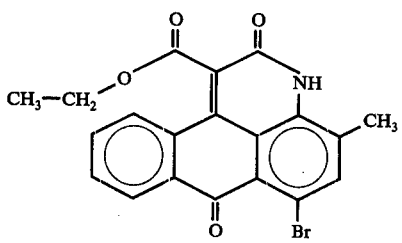

(4-bromo-2-methyl-3-carboethoxy anthrapyridone). Byproducts include 4-hydroxy-2-methyl-3-carboethoxy anthrapyridone

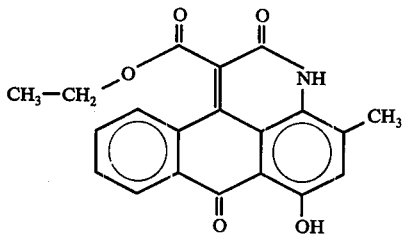

and 4-amino-2-methyl-3-carboethoxy anthrapyridone.

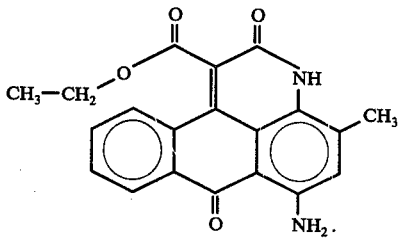

A sample of this type of reaction product (a product prepared essentially in accord with Example II) is obtained and brought to pH 7 and ultrafiltered in a diafiltration mode with deionized water to remove salts. 250 ml aliquots are taken, each containing 2.24 g of polymeric colorant and 2.0% wt, basis polymeric colorant, of the difficult-to-remove unreacted chromophore and chormophore byproducts, 1.0% of the 4-OH byproduct, 0.4% of the unreacted 4Br chromophore material, 0.4% of the 4-NH$_2$ byproduct). Each aliquot is charged to the retentate tank of an AMICON Corporation laboratory-scale ultrafiltration unit having a hollow fiber module with 1.3 ft$^2$ of pM-10 polysulfone anisotropic ultrafiltration membrane and ultrafiltered.

With the first sample, the make-up is changed to 50% methanol containing NaOH to pH 11. With the second a pH 11 (NaOH) 50% make-up is used. With the third a 5% pyridine (pH 11.0 by NaOH) solution is used, while with the fourth a pH 12.0 (NH$_4$OH) 5% pyridine solution is used. The following results are obtained after 6-7 diavolumes of ultrafiltration with these make-ups.

| Sample | Impurity Concentration | | | |
|---|---|---|---|---|
| Concentration$^a$ | 4-OH | 4-Br | 4-NH$_2$ | Total |
| Original Retentate | .981 | .400 | .365 | 1.64 wt% |
| Final Retentate | | | | |
| Run 1 | 1.64 | .032 | .13 | 1.80 |
| Run 2 | .653 | .022 | .121 | 0.80 |
| Run 3 | .64 | .019 | .11 | 0.77 |
| Run 4 | .0715 | .003 | .055 | 0.129 |

$^a$Figures given as weight % impurity/polydye.

EXAMPLE IV

The beneficial effect of pyridine addition is further shown by the following study. This is an expansion of the ultrafiltration of Example I. A crude reaction product in accord with that of Exmple I is obtained. The major, and most troublesome, organic contaminant is

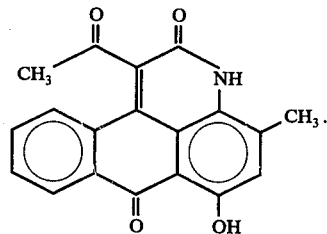

Its concentration in the feed and ultrafiltered product is measured. The ultrafiltration is carried out in the laboratory scale unit set out in Example III. Pyridine content is varied. The pH during all runs is maintained at 12–13.

The following results are obtained:

| Pyridine content, % | Relative efficiency of removal of 4-OH compound by ultrafiltration |
|---|---|
| 0. | 0.02 – 03 |
| 1 | 0.1 – 1.5 |
| 2 | 0.2 – 22 |
| 5 | 0.35 |
| 10 | 1.0 |
| 15 | 1* |
| 20 | 1* |

*With very high levels of contaminant, these values would increase to 1.5 – 2.0.

What is claimed is:

1. In the process for purifying a solution of a polymeric anthraquinone colorant wherein an aqueous feed solution comprising polymeric anthraquinone colorant of molecular weight above 1000 Daltons, polymeric colorant and polymeric colorant precursors and degradation products and inorganic salts of molecular weight below 1000 Daltons, is brought in contact with a semipermeable membrane under ultrafiltration conditions in a diafiltration mode for a plurality of diavolumes thereby forming an ultrafiltrate comprising polymeric anthraquinone colorant, polymeric colorant precursors and degradation products and inorganic salts of molecular weight below 1000 Daltons and a retentate comprising polymeric anthraquinone colorant of molecular weight above 1000 Daltons the improvement which comprises adding pyridine to said feed solution to a level of from 1 to 20% by volume and maintaining the pyridine content of the feed solution at this level for at least 1 diavolume by further addition of pyridine to the retentate.

2. The process of claim 1, wherein the pyridine content of the feed solution is maintained in the range of from 3% to 15% by volume.

3. The process of claim 1, wherein the pyridine content of the feed solution is maintained in the range of from 3% to 15% for from 1 to 10 diavolumes.

4. The process of claim 3 wherein the semipermeable membrane is an asymmetric semipermeable ultrafiltration membrane.

5. The process of claim 4 wherein the ultrafiltration conditions include a temperature of from 10° to 75° C and an ultrafilter inlet pressure of from 15 to 200 psig.

6. The process of claim 5 wherein the ultrafiltration conditions further include a feed pH of from 9 to 13.

7. The process of claim 6 wherein the ultrafiltration conditions further include a feed pH of from 11 to 13.

* * * * *